United States Patent
Svec

(10) Patent No.: US 10,776,361 B2
(45) Date of Patent: Sep. 15, 2020

(54) TIME SERIES DATABASE SEARCH SYSTEM

(71) Applicant: salesforce.com, inc., San Francisco, CA (US)

(72) Inventor: Brandon Svec, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 383 days.

(21) Appl. No.: 15/482,578

(22) Filed: Apr. 7, 2017

(65) Prior Publication Data

US 2018/0293280 A1 Oct. 11, 2018

(51) Int. Cl.
| | |
|---|---|
| G06F 16/2455 | (2019.01) |
| G06F 16/28 | (2019.01) |
| G06F 16/22 | (2019.01) |
| G06F 16/27 | (2019.01) |
| G06F 16/215 | (2019.01) |
| G06F 16/2458 | (2019.01) |

(52) U.S. Cl.
CPC ...... *G06F 16/24553* (2019.01); *G06F 16/215* (2019.01); *G06F 16/2255* (2019.01); *G06F 16/2477* (2019.01); *G06F 16/278* (2019.01); *G06F 16/289* (2019.01)

(58) Field of Classification Search
CPC .......... G06F 16/24553; G06F 16/2255; G06F 16/289; G06F 16/2477; G06F 17/30483; G06F 17/3033; G06F 17/30607; G06F 17/3055; G06F 16/27; G06F 16/278
See application file for complete search history.

(56) References Cited

U.S. PATENT DOCUMENTS

| | | | | |
|---|---|---|---|---|
| 8,392,384 | B1 * | 3/2013 | Wu ..................... | G06F 16/1748 707/693 |
| 10,031,935 | B1 * | 7/2018 | Cole .................... | G06F 16/2315 |
| 2007/0288495 | A1 * | 12/2007 | Narasayya ........... | G06F 16/217 |
| 2008/0091691 | A1 * | 4/2008 | Tsuji .................... | G06F 16/284 |
| 2010/0082529 | A1 * | 4/2010 | Mace ................... | G06F 11/1435 707/609 |
| 2011/0178996 | A1 * | 7/2011 | Pendlebury ......... | G06F 11/1453 707/692 |
| 2014/0156642 | A1 * | 6/2014 | Johnson ............. | G06F 16/24573 707/722 |
| 2015/0213631 | A1 * | 7/2015 | Vander Broek ..... | G06F 16/2477 345/589 |
| 2015/0254307 | A1 * | 9/2015 | Johnson .............. | G06F 16/2425 707/763 |
| 2017/0270153 | A1 * | 9/2017 | Bantupalli .............. | G06F 16/27 |
| 2018/0089328 | A1 * | 3/2018 | Bath .................... | G06F 3/0481 |

* cited by examiner

*Primary Examiner* — James E Richardson
(74) *Attorney, Agent, or Firm* — Butzel Long

(57) ABSTRACT

Systems, device and techniques are disclosed for a time series database search system. A data object may be received. The data object may include timestamp data indicating a time at which an event occurred, a value indicating a measure of the event, and key-value pairs comprising data associated with the event. A hash ID may be generated by hashing the one or more key-value pairs. The timestamp data, the value, and the hash ID may be stored in a first database as an object in the first database. The key-value pairs and the hash ID may be stored in a second database as an object in the second database.

17 Claims, 9 Drawing Sheets

US 10,776,361 B2

TIME SERIES DATABASE SEARCH SYSTEM

BACKGROUND

Events generated by systems, such as servers, can be stored as data in a time series database. The time series database may allow for the retrieval, viewing, and analysis of the data as a time series. A user's ability to search the data stored in the time series database may be limited, as the time series database may have a very large dataset. A user may need knowledge of the structure of the data stored in the database in order to accurately search the database. Other database types may store data in a manner that allows for easier searching of the data. These database types may be less capable of allowing the retrieval, viewing, and analysis of the data as a time series, and may lack real time updating of the data.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
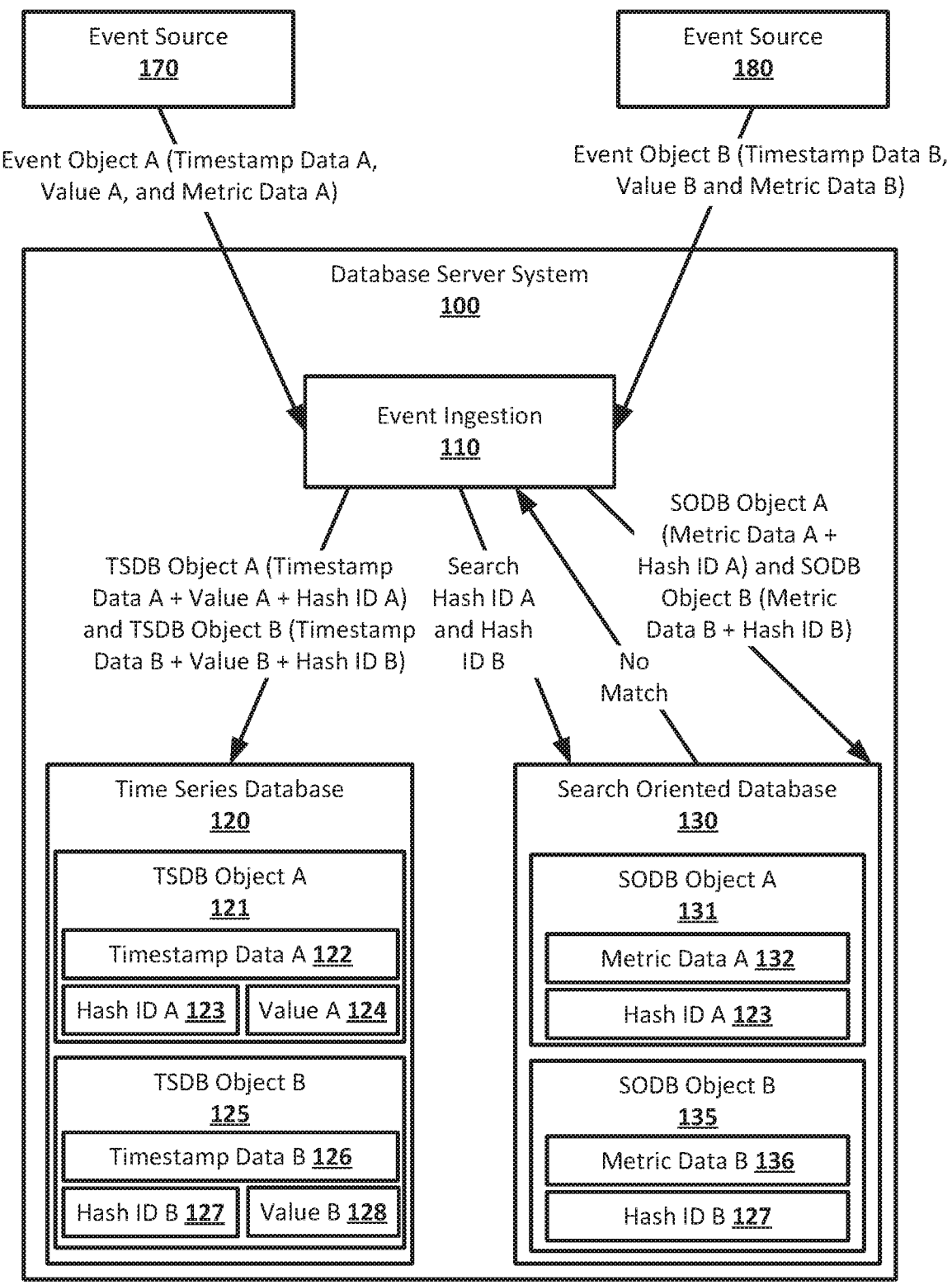
FIG. 1 shows an example system for a time series database search system according to an implementation of the disclosed subject matter.

Techniques disclosed herein enable a time series database search system, which may allow for the storage and retrieval of data in a manner that allows for both efficient searching of data without requiring knowledge of the structure of stored data and for the viewing and analysis of data as a time series. The time series database search system may perform data ingestion, during which data generated by events, in the form of event objects, may be received. An event object may be any suitable data object, and may include timestamp data, a value, and metric data. The timestamp data may indicate the time at which the event that generated the event object occurred. The value may be any suitable value, such as a number, representing any suitable measure of the event, such as, for example, a number of emails sent out by a server. The metric data may include any number of key-value pairs which may include any suitable data about the event. The key in a key-value pair may be a description or other identifier for the value, for example "Server Name", and the value may be the value of that key, for example, the name of the server. One of the keys may be a "Measure" key, with a paired value that indicates what the value for the measure of the metric measures. For example, the "Measure" key may have a value of "sent", indicating that the value for the measure of the metric is a number of emails that were sent. Metric data in an event object may be hashed to generate a hash ID for the event object. The timestamp data, value, and hash ID for the event object may be combined in a time series database object which may be stored in a time series database. Search-oriented database objects already stored in a search-oriented database may be searched for the hash ID for the event object. If none of the search-oriented database objects in the search-oriented database include a hash ID that matches the hash ID generated for the event object, the metric data and hash ID for the event object may be combined into a new search-oriented database object which may be stored in the search-oriented database. If a search-oriented database object in the search-oriented database includes a hash ID that matches the hash ID generated for the event object, the metric data for the event object may be discarded without storing a new search-oriented database object.

Searching for the hash ID generated for an event object before storing the metric data from the event object in the search-oriented database may prevent the storage of duplicative objects in the search-oriented database. For example, certain events may recur on a server system that acts as an event source. The event objects for these recurring events may have identical metric data, and may differ only by having different timestamp data indicating the different times at which the recurring event occurred. Event objects for recurring events may also differ by having different values for the measure of the event, although some event objects for a recurring event may have the same values, as the value for an instance of recurring event may measure the instance independent of any other instances of the recurring event. Because the metric data may be identical across the event objects generated by a recurring event, the hash IDs generated by hashing the metric data for each of these event objects may also be identical. The search-oriented database objects may include the metric data and hash ID, but not the timestamp data or value, from an event object, and may be identical for event objects that have the same metric data. Only one copy of such a search-oriented database object may need to be stored in the search-oriented database. Storing additional search-oriented database objects generated from event objects for a recurring event may result in storage of multiple copies of the same search-oriented database object, which may increase the storage space needed by the search-oriented database and slow down searching of the search-oriented database.

Storing only one copy of a search-oriented database object for a recurring event may reduce the storage space needed by the search-oriented database and reduce the amount of time and computational resources needed to search the search-oriented database. For example, a recurring event may recur once-per-second, so storing only one copy of a search-oriented database object for the recurring event may result in the search-oriented database storing one search-oriented database object, instead of the 86,400 search-oriented database objects per day that would be stored if a search-oriented database object were stored on each recurrence of the event. The time series database may still store 86,400 time series database objects per day, one for each recurrence of the event, but these objects may be smaller and easier to search, as they may only include timestamp data that is unique to each recurrence of the event, the value for the measure of the event, and the hash ID that is common to all recurrences of the event. For example, the time series database may be implemented using a hash table with chaining for collisions.

The metric data in an event object may include any number of key-value pairs. Any suitable data may be stored in the key-value pairs of the metric data, including, for example, server and server cluster names, application names, IP addresses, and any other suitable data related to an event that may occur on a server system. For example, the metric data may be related to an event where an email was sent by a server system. Keys in the key-value pairs may be arbitrary. This may allow for metric data for different event objects to have different keys, and two different event objects may share any number of keys. For example, two different event objects may have the exact same keys, or may have no keys in common, or may have any other number of keys in common. Event objects generated based on a recurring event may include metric data in which all the keys and their corresponding values are identical across the all of the generated event objects.

The data stored in the time series database and search-oriented database may be retrieved in response to a search query and displayed and analyzed as a time series. The search query may be received from any suitable source and may be based input from a user. The search query may be any suitable such query including any suitable combination of search terms, such as, for example, a value that may be stored in a key-value pair, such as a server name, or a time range. The search terms may be joined or modified by any suitable search operators. The time range may be any suitable range of time specified in any suitable manner. The key-value pairs in the metric data of the search-oriented database objects in the search-oriented database may be searched based on the search query to determine which search-oriented database objects are responsive to the search query. The hash IDs from the search-oriented database objects which are responsive to the search query may be searched for in the time series database. The timestamp data and value from a time series database object with a hash ID that matches a searched-for hash ID may be combined with the metric data from the search-oriented database object with the searched-for hash ID to generate an event object. Timestamp data that indicates a time outside a time range specified in a search query may not be combined with metric data to generate an event object. The event objects generated by combining timestamp data and values from the time series database with metric data from the search-oriented database may be sent as a response to the search query. The event objects may be generated using the metric data from any number of search-oriented database objects and time series database objects. These event objects may be time series data, which may be displayed, explored, aggregated, and analyzed as a time series using the timestamp data and values in the event objects.

The same metric data may be combined with different timestamp data and values to generate multiple event objects when the time series database includes multiple time series database objects with the same hash ID, which may indicate separate instances of a recurring event. For example, an event may recur 1000 times, resulting in 1000 event objects whose data may be stored in the time series database search system as 1000 time series database objects and one search-oriented database object. The 1000 time series database objects may have different timestamp data from each other, values which may be the same or different, and the same hash ID, and the search-oriented database object may have the same hash ID as the 1000 time series database objects and the metric data that describes the recurring event. A search query to which the one search-oriented database object is responsive may result in the generation of 1000 event objects based on the combination of the metric data from the one search-oriented database object with the timestamp data from and values each of the 1000 time series database objects that have the same hash ID as the one search-oriented database object. The 1000 event objects generated from time series database objects and search-oriented database objects may include the same metric data and timestamp data and values as the 1000 event objects originally generated by the event source based on the recurring event, and may be copies of the originally generated event objects, may include the same data as the original event objects in a different format, and may also include additional data, such as the hash ID.

The search-oriented database may index the data in the search-oriented database objects in any suitable manner. For example, the search-oriented database may build an index based on the keys and values in the key-value pairs of the search-oriented database objects. The keys and values may also be used to guide searches. For example, a user may submit a search query using a form which may allow a user to select search terms from the keys and values from the metric data of stored search-oriented database objects. This may ensure that a user only searches for keys or values which are stored in the search-oriented database.

Event objects may be received by the time series database search system in any suitable manner. For example, event sources, such as server systems, may be publishers in a publisher/subscriber system. The time series database search system may be a subscriber, and may subscribe to the data published by the publisher server systems, which may be, for example, the event objects. The event objects may be ingested in any suitable manner. For example, event objects may be ingested as they arrive at the time series database search system, or may be stored and batch processed.

The time series database and search-oriented database may be implemented on the same physical server, or may be on separate servers which may be part of the same server cluster or may belong to different server clusters, for example, sited at different geographic locations. Both the time series database and search-oriented database may be private databases, or the time series database may be a public database, for example, a cloud-hosted database. The time series database may be publicly hostable because the time series database objects may only include hash IDs, which may be based on one-way hashing, timestamp data, and values, which may only be numbers. Data which may need to be kept privately may be stored in the metric data stored in the search-oriented database, which may be a private database with no public access.

Time series database objects and search-oriented database objects may be generated from event objects in any suitable manner. For example, the time series database may generate time series database objects separately from the search-oriented database which may generate search-oriented database objects. The time series database objects and search-oriented database objects may also be generated by the same component of the time series database search system, which may send the send time series database objects to be stored in the time series database and search-oriented database objects to be stored in the search-oriented database.

Search queries may be received in any suitable manner. For example, an application programming interface (API) may allow a user to submit search queries to the time series database search system and receive event objects that are responsive to the search query. The API may be accessible in any suitable manner, such as, for example, through an application running on a personal computing device, such a desktop, laptop, smartphone, or tablet, accessible to a user.

FIG. 1 shows an example system for a time series database search system according to an implementation of the disclosed subject matter. A database server system 100 may be any suitable may be any suitable computing device, such as, for example, a computer 20 as described in FIG. 9, or component thereof, for implementing a time series database search system. The database server system 100 may include event ingestion 110, a time series database 120, and a search-oriented database 130. The database server system 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For simplicity, generic components such as the processor, short and long term storage, the operating system, much of the database management system are not shown. The server system 100 may be part of a computing system and network infrastructure, or may be otherwise connected to the computing system and network infrastructure, including a larger server network which may include other server systems similar to the server system 100.

The event ingestion 110 may be a component of the database server system 100 that may include any suitable combination of hardware and software for ingesting data, for example, in the form of event objects, and preparing the data for storage in the time series database 120 and the search-oriented database 130. The event ingestion 110 may hash metric data included in event objects to generate hash IDs, and may generate time series database objects and search-oriented database objects from event objects and hash IDs. The event ingestion 110 may be a separate component of the database server system 100 from the time series database 120 and the search-oriented database 130, and may, for example, be part of a separate physical computing device or the same computing device as either or both of the time series database 120 and the search-oriented database 130. The event ingestion 110 may also be distributed among the time series database 120 and the search-oriented database 130. For example, the time series database 120 may include the components of the event ingestion 110 that generate time series database objects and the search-oriented database 130 may include the components of the event ingestion 110 that generate search-oriented database objects.

The time series database 120 may be any suitable combination of hardware and software for implementing a time series database which may store time series database objects. The time series database 120 may store time series database objects in any suitable manner and format, using any suitable hardware storage devices. The time series database 120 may share hardware with the search-oriented database 130, or may be implemented on separate hardware. The time series database 120 may be private, or may be publicly for example, for example, through cloud-based data hosting. The time series database 120 may be implemented using storage and data retrieval techniques that allow for more efficient retrieval of data objects that include timestamp data, values, and hash IDs. For example, the time series database 120 may store time series database objects using a hash table, and may use any suitable chaining for collisions.

The search-oriented database 130 may be any suitable combination of hardware and software for implementing a search-oriented database which may store search-oriented database objects. The search-oriented database 130 may store search-oriented database objects in any suitable manner and format, using any suitable hardware storage devices. The search-oriented database 130 may share hardware with the time series database 120, or may be implemented on separate hardware. The search-oriented database may be implemented using any suitable data storage and retrieval techniques that allow for more efficient retrieval of data objects that include metric data, including arbitrary key-value pairs, and hash IDs. For example, the search-oriented database may implement any suitable search-indexing for the key-value pairs of the metric data in stored search-oriented database objects.

Event sources, such as event source 170 and event source 180, may be any suitable sources of data related to events that occur at the event sources. For example, event sources may be server systems or other computing devices, or software running on computing devices, which may generate data, in the form of event objects, when events occur on them. Events which result in the generation of event objects may be, for example, the sending or receiving of email by a server system, access by users to a computing device, or operations of any software running on a computing device or of any hardware of a computing device, including internal operations and operations involving communication with other computing devices over any suitable network connections. Event sources, such as the event source 170 and the event source 180, may publish or otherwise transmit event objects when they are generated so that the event objects may be received at the database server system 100. The event sources 170 and 180 may be, for example, part of the same server system as the database server system 100, or may be separate systems which make data available to the database server system 100. Event objects generated by event sources such as the event sources 170 and 180 may be data objects in any suitable format. For example, event objects may be Javascript Object Notation (JSON) objects.

An event occurring at the event source 170 may result in the generation of an event object, for example, event object A, which may be a data object. Event object A may include timestamp data A, which may include data indicating the time at which the event that caused the generation of event object A occurred, and value A, which may be a number indicating a measure of the event that caused the generation of event object A. Event object A may also include metric data A. The metric data A may include any suitable number of key-value pairs which may include data related to the event that caused the generation of event object A. For example, if event object A was generated when email was sent from the event source 170 to multiple recipients, the key-value pairs in metric data A may include a sever name for the event source 170, a server cluster name for the event source 170, a client name indicating a party the email was sent by or on behalf of, an indication of whether the email was sent successfully, and any other suitable data that may be generated by or related to the sending of an email from a server. The value A may indicate, for example, the number of individual recipients the email was sent to successfully. The emails sent to the multiple recipients may be, for example, part of a marketing campaign, and may be individualized emails using the same template sent out as part of the same event that causes the generation of event object A.

An event occurring at the event source 180 may similarly result in the generation of event object B. Event object B may include timestamp data B, which may include data indicating the time at which the event that caused the generation of event object B occurred, and value B, which may be a number indicating a measure of the event that caused the generation of event object B. Event object B may also include metric data B. The metric data B may include any suitable number of key-value pairs which may include data related to the event that caused the generation of event object B. Event object A and event object B may be published, or otherwise transmitted, for example, over any suitable data carrying connection such as a wired or wireless network connection or direct connection, by the event source 170 and the event source 180, such that event object A and event object B may be received by the database server system 100.

The database server system 100 may receive event object A and event object B at the event ingestion 100. For example, the event ingestion 100 may be a subscriber to data published by the event source 170 and the event source 180, or may receive event object A and event object B directly from the event source 170 and the event source 180. The event ingestion 110 may hash metric data A to produce hash ID A. The event ingestion 110 may hash metric data A in any suitable manner, using any suitable one-way hash function. For example, the key-value pairs of metric data A may be represented as a single string of characters, for example, through concatenation, which may then be hashed to produce hash ID A, which may also be a string of characters. The event ingestion 110 may similarly hash metric data B to produce hash ID B.

The event ingestion 110 may generate time series database (TSDB) object A by combining hash ID A with timestamp data A and value A from event object A. TSDB object A may then be stored in the time series database 120. TSDB Object A 121, stored in the time series database 120, may include timestamp data A 122, which may be timestamp data A from event object A, value A 124, which may be value A from event object A, and hash ID A 123, which may be hash ID A generated by hashing metric data A from event object A. Similarly, the event ingestion 110 may generate the TSDB object B by combining hash ID B with timestamp data B and value B from event object B. TSDB object B may then be stored in the time series database 120. TSDB Object B 125, stored in the time series database 120, may include timestamp data B 126, which may be timestamp data B from event object B, value B 128, which may be value B from event object B, and hash ID B 127, which may be hash ID B generated by hashing metric data B from event object B. A TSDB object, such as the TSDB object A 121 and TSDB object B 125, may be a data object in any suitable format, such as, for example, a JSON object.

The event ingestion 110 may submit search queries to the search-oriented database 130 to search for hash ID A and hash ID B. If the search results indicate that there is no match for hash ID A, the event ingestion 110 may generate search-oriented database (SODB) object A by combining hash ID A with metric data A from event object A. SODB object A may then be stored in the search oriented database 130. SODB object A 131, stored in the search-oriented database 130, may include metric data A 132, which may be metric data A, for example, in the form of key-value pairs, from event object A, and hash ID A 123, which may be hash ID A generated by hashing metric data A from event object A. Similarly, if the search results indicate that there is no match for hash ID B, the event ingestion 110 may generate search-oriented database (SODB) object B by combining hash ID B with metric data B from event object B. SODB object B may then be stored in the search oriented database 130. SODB object B 135, stored in the search-oriented database 130, may include metric data B 136, which may be metric data B, for example, in the form of key-value pairs, from event object A, and hash ID B 127, which may be hash ID B generated by hashing metric data B from event object B. A SODB object, such as the SODB object A 131 and SODB object B 135, may be data objects in any suitable format, such as, for example, JSON objects.

Figure 2:
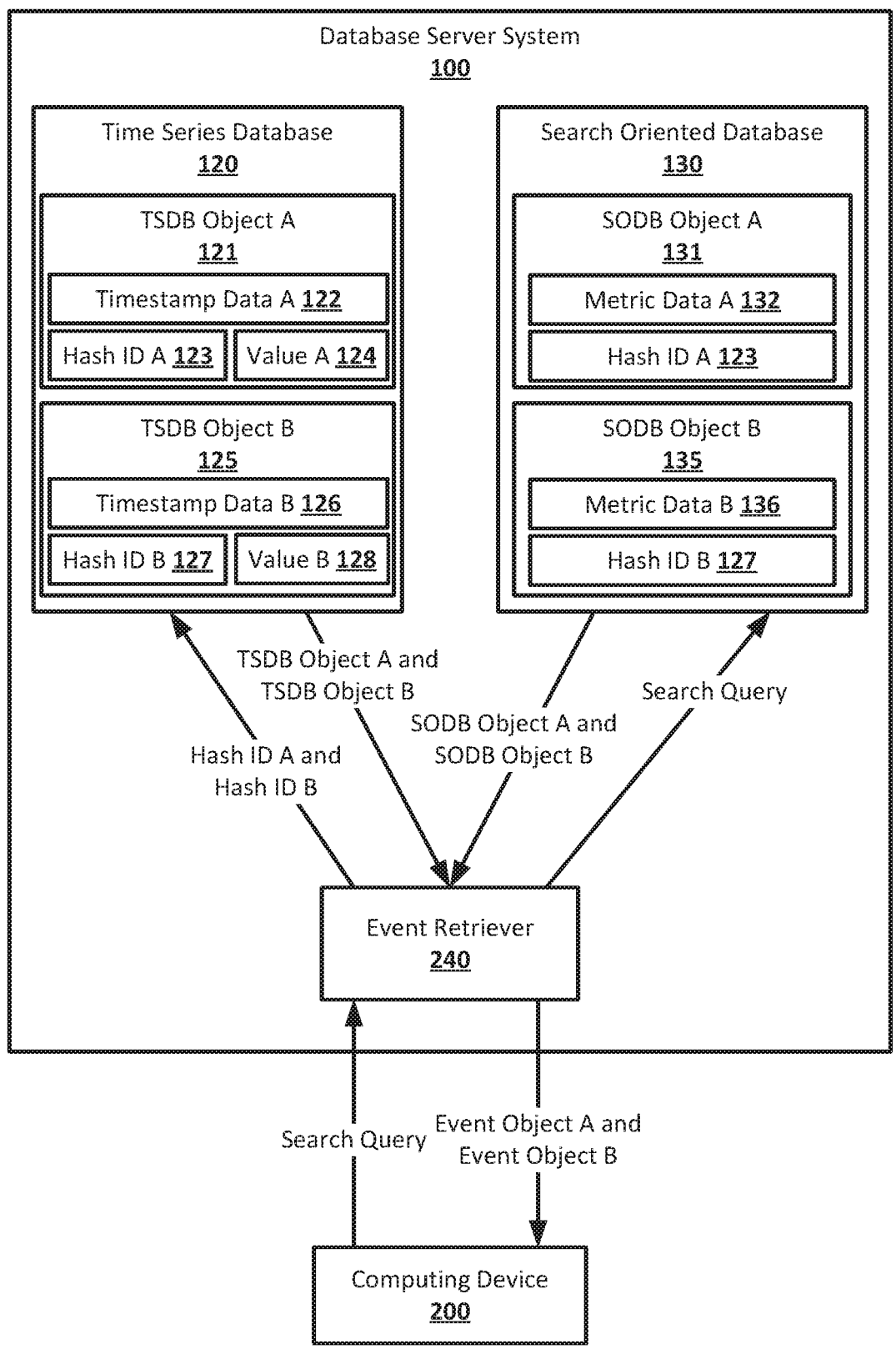
FIG. 2 shows an example system for a time series database search system according to an implementation of the disclosed subject matter.

FIG. 2 shows an example system for a time series database search system according to an implementation of the disclosed subject matter. Event retriever 240 may be a component of the database server system 100 that may include any suitable combination of hardware and software for retrieving data about events that are responsive to a search query, for example, in the form of TSDB objects and SODB objects, and preparing and transmitting the data to a computing device, such as computing device 200, from which the search query was received. The event retriever 240 may submit received search queries to the search-oriented database 130, which may search SODB objects in the search-oriented database 130 based on search terms in the search query. The event retriever 240 may transmit hash IDs to be searched for in the time series database 120. The event retriever 240 may combine metric data from SODB objects and timestamp data from TSDB objects to generate event objects that may be responsive to a search query. The event retriever 240 may be a separate component of the database server system 100 from the time series database 120 and the search-oriented database 130, and may, for example, be part of a separate physical computing device or the same computing device as either or both of the time series database 120 and the search-oriented database 130.

The computing device 200 may be any suitable computing device, such as, for example, a laptop, desktop, tablet, smartphone, or other computing device, which may be used to submit a search query to the database server system 100. The search query may include terms to be searched and may be submitted by, for example, a user through entry of search terms into the computing device 200, or in any other suitable manner. For example, a user may submit a search query with a search term that is the name of a server, as the user may wish to view a time series of events that took place on that server, such as, for example, a time series showing the volume of emails sent out by the server as it varies over a time period. The search query may be in any suitable format. For example, the search query may only specify values, and not corresponding keys, such that the specified values may be searched against all keys in the search-oriented database, or keys without corresponding values, or the search query may specify both values and corresponding keys, for example, if the user has sufficient knowledge of the structure of metric data stored in the search-oriented database 130, or any other suitable combination of keys, values, and keys with corresponding values. The search query may also specify a time range in addition to values, or may only specify a time range. The search query may be submitted, for example, using a form which allows a user to select from the keys and values stored in search-oriented database 130, which may be an indexed search database.

The search query submitted by the computing device 200 may be received at the database server system 100 by event retriever 240. The event retriever 240 may submit the search query to the search-oriented database 130. The search-oriented database 130 may perform a search on any search terms in the search query, and may return responsive SODB objects to the event retriever 240. For example, the metric data A 132 and the metric data B 136 may match the search terms in the search query, which may result in the SODB object A 131 and the SODB object B 135 being returned to event retriever 240 as responsive SODB objects. The event retriever 240 may then send the hash ID A 123 and the hash ID B 127 from the responsive SODB objects to the time series database 120.

The time series database 120 may be searched for the hash ID A 123. The TSDB object A 121 may be determined to have a matching hash ID A 123, and may be returned to the event retriever 240. The time series database 120 may also be searched for the hash ID B 127. The TSDB object B 125 may be determined to have a matching hash ID B 127, and may be returned to the event retriever 240. When the search query includes a time range, timestamp data, such as the timestamp data A 122 and timestamp data B 126, may be checked to determine if the time indicated by the timestamp data for a TSDB object falls within the searched for time range. TSDB objects with timestamp data indicating a time outside the searched for time range may be considered nonresponsive to the search query, and may not be returned to the event retriever 240.

The event retriever 240 may use the SODB object A 131 and the TSDB object A 121 to generate event object A by combining the metric data A 132 with the timestamp data A 122 and the value A 124. The event object A generated by the event retriever 240 may be identical to the event object A generated by the event source 170, or may include the same data as the event object A generated by the event source 170 in a different format, and may or may not include additional data. For example, the event object A generated by the event retriever 240 may also include the hash ID A 123, or may omit the hash ID A 123. The event retriever 240 may similarly use the SODB object B 135 and the TSDB object B 125 to generate event object B by combining the metric data B 136 with the timestamp data B 126 and the value B 128. The event object B generated by the event retriever 240 may be identical to the event object B generated by the event source 170, or may include the same data as the event object B generated by the event source 170 in a different format, and may or may not include additional data. For example, the event object B generated by the event retriever 240 may also include the hash ID B 127, or may omit the hash ID B 127.

The event retriever 240 may send the generated event object A and event object B to the computing device 200 as data objects responsive to the search query submitted by the computing device 200. The computing device 200 may be able to use event object A and event object B as time series data due to the presence of the value A 124, the value B 128, the timestamp data A 122 and the timestamp data B 127 B, allowing for time-based visualization, aggregation, and analysis of the data included in the key-value pairs of the metric data A 132 and the metric data B 136.

When the search query only includes a time-range, the time range may be used to first retrieve responsive TSDB objects from the time series database 120, which may allow for efficient retrieval of TSDB objects based on time ranges. The hash IDs of responsive TSDB objects may then be search for in the search-oriented database 130 to retrieve responsive SODB objects to be combined with the responsive TSDB objects.

Figure 3:
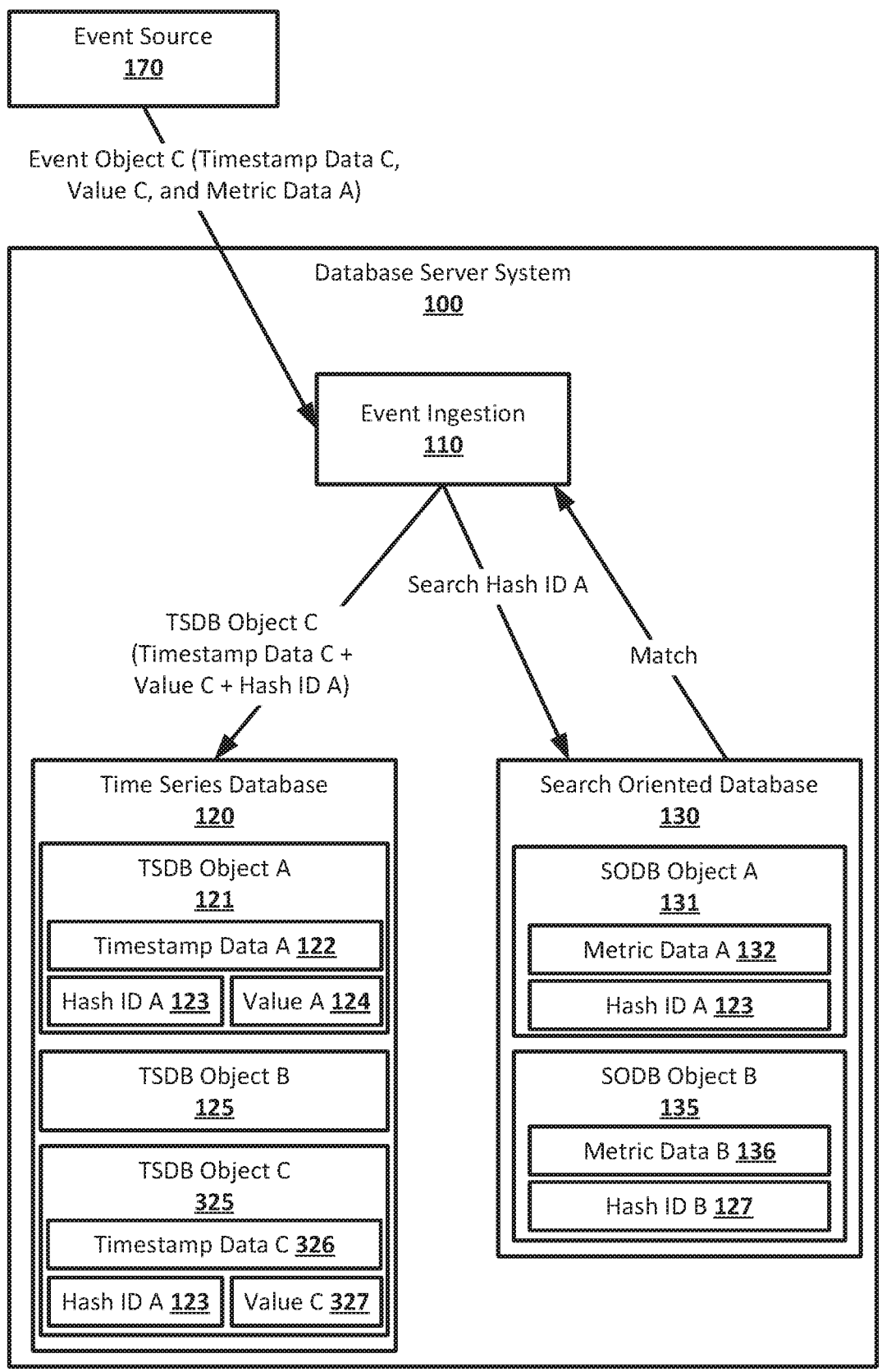
FIG. 3 shows an example system for a time series database search system according to an implementation of the disclosed subject matter.

FIG. 3 shows an example system for a time series database search system according to an implementation of the disclosed subject matter. An event occurring at the event source 170 may result in the generation of event object C. Event object C may include timestamp data C, which may include data indicating the time at which the event that caused the generation of event object C occurred, and value C, which may be a number indicating a measure of the event that caused the generation of event object C. Event object C may also include metric data A. The metric data A may be any suitable number of key-value pairs which may include data related to the event that caused the generation of event object C and may be the same metric data as the metric data A 132 stored in the search-oriented database 130 as part of the SODB object A 131. For example, the key-value pairs of the metric data A of event object C may be identical to the key-value pairs of the metric data A 132. Event object C may be generated based on the same recurring event at the event source 170 which also generated event object A.

The database server system 100 may receive event object C at the event ingestion 110. For example, the event ingestion 110 may be a subscriber to data published by the event source 170, or may receive event object C directly from the event source 170. The event ingestion 110 may hash metric data A to produce hash ID A, which may be identical to the hash ID A 123. The event ingestion 110 may hash metric data A using the same hash function used to hash metric data A from event object A and metric data B from event object B.

The event ingestion 110 may generate time series database (TSDB) object C by combining hash ID A with timestamp data C and value C from event object C. TSDB object C may then be stored in the time series database 120 along with the TSDB object A 121 and the TSDB object B 125. TSDB object C 325, stored in the time series database 120, may include timestamp data C 326, which may be timestamp data C from event object C, value C 327, which may be value C from event object C, and hash ID A 123, which may be hash ID A generated by hashing metric data A from event object C.

The event ingestion 110 may submit a search query to the search-oriented database 130 to search for hash ID A. If the search results returned from the search-oriented database 130 indicate that there is a match for hash ID A, the event ingestion 110 may not generate a SODB object using metric data A from event object C and may instead discard event object C. For example, the SODB object A 131 may include the hash ID A 123. When the search-oriented database 130 is searched for the hash ID A generated by hashing the metric data A from event object C, the hash ID A 123 in the SODB object A 131 may be found as a match. This may indicate that the search oriented database 130 already stores a copy of metric data A, as the metric data A 132 in SODB object A 131. It may be unnecessary to store an SODB object for the event object C in the search-oriented database 130, as such an SODB object would be identical to the SODB object A 131, which is already stored. This may allow the search-oriented database 130 to use less storage space, and may reduce the size of the dataset allowing for faster searching.

Figure 4:
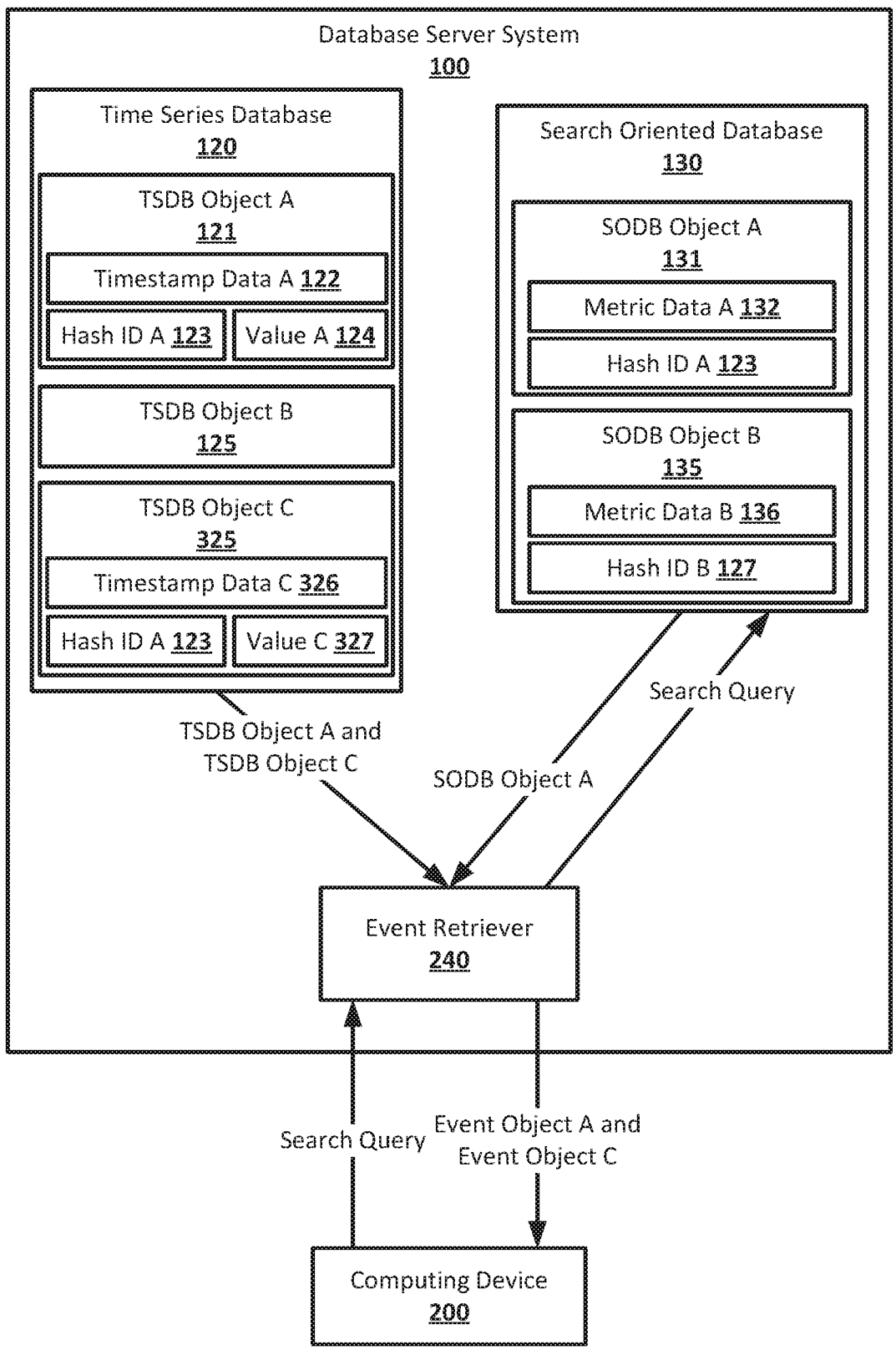
FIG. 4 shows an example system for a time series database search system according to an implementation of the disclosed subject matter.

FIG. 4 shows an example system for a time series database search system according to an implementation of the disclosed subject matter. A search query submitted by the computing device 200 may be received at the database server system 100 by the event retriever 240. The event retriever 240 may submit the search query to the search-oriented database 130. The search-oriented database 130 may perform a search on any search terms in search query, and may return responsive SODB objects to the event retriever 240. For example, the metric data A 132 may match the search terms in the search query, which may result in the SODB object A 131 being returned to event retriever 240 as a responsive SODB object. The event retriever 240 may then send the hash ID A 123, from the SODB object A 131, to the time series database 120. The time series database 120 may be searched for the hash ID A 123. TSDB object A 121 and the TSDB object C 325 may both be determined to have the matching hash ID A 123. The TSDB object A 121 and the TSDB object C 325 may be returned to the event retriever 240.

The event retriever 240 may use the SODB object A 131 and the TSDB object A 121 to generate event object A by combining the metric data A 132 with the timestamp data A 122 and the value A 124. The event object A generated by the event retriever 240 may be identical to the event object A generated by the event source 170, or may include the same data as the event object A generated by the event source 170 in a different format, and may or may not include additional data. The event retriever 240 may similarly use the SODB object C 325 and the TSDB object A 121 to generate event object C by combining the metric data A 132 with the timestamp data C 326 and the value C 327. The event object C generated by the event retriever 240 may be identical to the event object C generated by the event source 170, or may include the same data as the event object C generated by the event source 170 in a different format, and may or may not include additional data.

The event retriever 240 may send the generated event object A and event object C to the computing device 200 as data objects responsive to the search query submitted by the computing device 200. The computing device 200 may be able to use event object A and event object C as time series data due to the presence of the value A 124, the value C 327, the timestamp data A 122 and the timestamp data C 326, allowing for time-based visualization, aggregation, and analysis of the data included in the key-value pairs of the metric data A 132. For example, a time series visualization using event object A and event object C may show that the same event, as described by the metric data A 132, occurred both at the time indicated in the timestamp A 122 and the time indicated in the timestamp C 326, which may indicate a later time than the timestamp A 122, and may also show differences in the value A 124 and the value C 327, for example, indicating a different number of emails were sent out at the time indicated in the timestamp A 122 than at the timestamp C 326.

Figure 5:
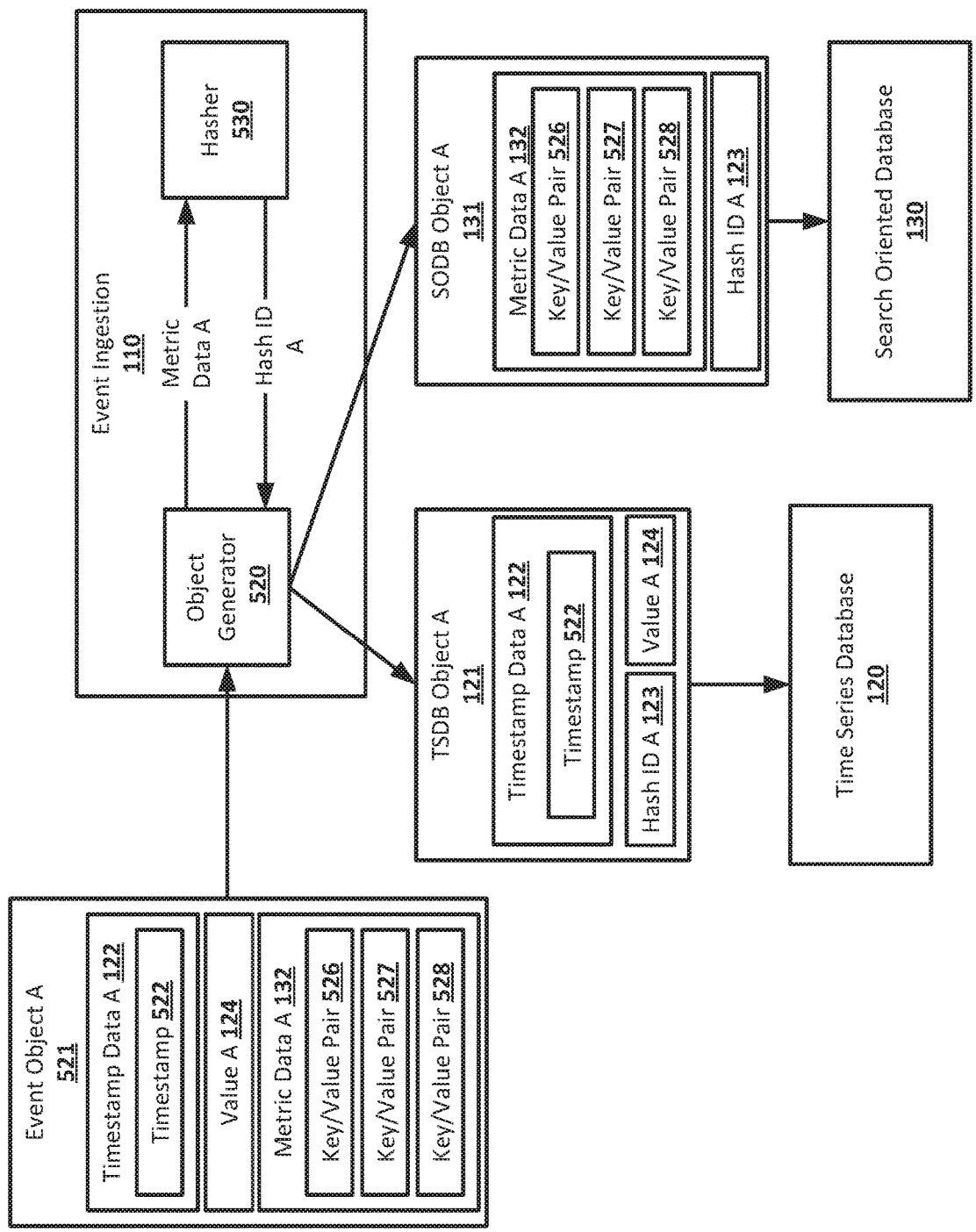
FIG. 5 shows an example system for a time series database search system according to an implementation of the disclosed subject matter.

FIG. 5 shows an example system for a time series database search system according to an implementation of the disclosed subject matter. The event ingestion 110 may include an object generator 520 and hasher 530. The object generator 520 may be implemented with any suitable combination of hardware and software, and may be able to generate data objects, such as TSDB objects and SODB objects, from other data objects, such as event objects, and data such as hash IDs. The hasher 530 may be implemented with any suitable combination of hardware and software, and may implement any suitable one-way hashing function to generate hash IDs from input data, such as, for example, metric data including key-value pairs.

Event object A 521, which may be, for example, event object A generated by event source 170, may be received by the object generator 520 of the event ingestion 110. The metric data A 132, which may include key-value pairs 526, 527, and 528, may be extracted from the event object A 521, for example, by the object generator 520, and sent to the hasher 530. The hasher 530 may hash the metric data A 132 to generate the hash ID A. For example, the hasher 530 may concatenate the key-value pairs 526, 527, and 528 into a single string of characters which may then be hashed into another string of characters which may be hash ID A.

The hash ID A generated by the hasher 530 may be returned to the object generator 520. The search oriented database 130 may be searched, and it may be determined that there is no already stored SODB object with the hash ID A. The object generator 520 may combine the hash ID A with the metric data A 132 from the event object A 521 to generate the SODB object A 131. The SODB object A 131 may include the metric data A 132, including the key-value pairs 526, 527, and 528, and the hash ID A 123, and may be sent to the search-oriented database 130 to be stored. The object generator 520 may combine the timestamp data A 122, which may include timestamp 522, and the value A 124 from the event object A 521 with the hash ID A to generate the TSDB object A 121. The TSDB object A 121 may be sent to the time series database 120 to be stored.

Figure 6:
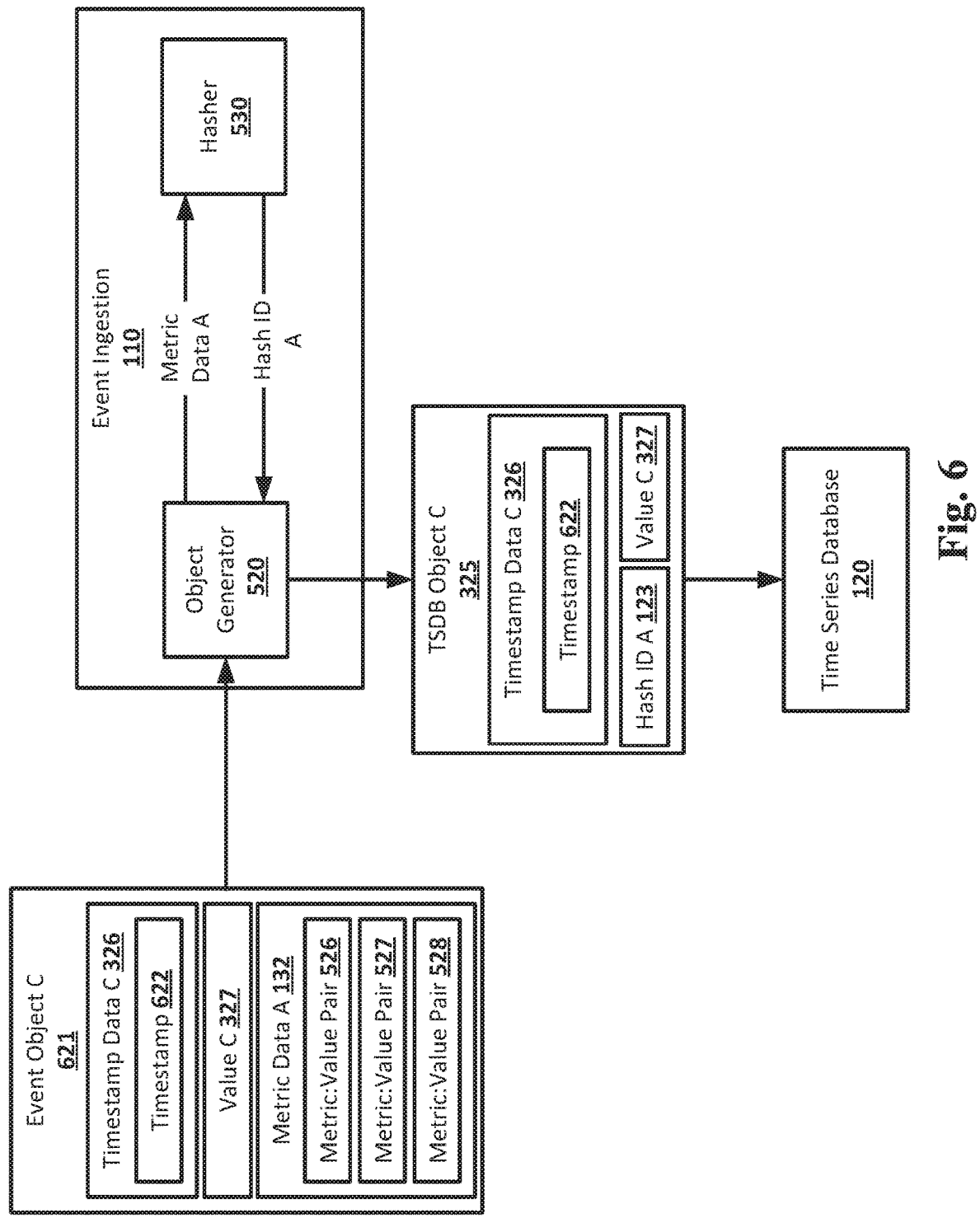
FIG. 6 shows an example system for a time series database search system according to an implementation of the disclosed subject matter.

FIG. 6 shows an example system for a time series database search system according to an implementation of the disclosed subject matter. Event object C 621, which may be, for example, event object C generated by the event source 170, may be received by the object generator 520 of the event ingestion 110. The metric data A 132, which may include key-value pairs 526, 527, and 528, may be extracted from the event object C 621, for example, by the object generator 520, and sent to the hasher 530. The hasher 503 may hash the metric data A 132 to generate the hash ID A. For example, the hasher 503 may concatenate the key-value pairs 526, 527, and 528 into a single string of characters which may then be hashed into another string of characters which may be hash ID A.

The hash ID A generated by the hasher 530 may be returned to the object generator 520. The search oriented database 130 may be searched, and it may be determined that there is an already stored SODB object with the hash ID A, for example, the SODB object A 131 stored based on event object A 521. The object generator 520 may not generate another SODB object based on the event object C 621. The object generator 520 may combine the timestamp data C 326, which may include timestamp 622, and the value C 327 from the event object C 621 with the hash ID A 123 to generate the TSDB object C 325. The TSDB object C 325 may be sent to the time series database 120 to be stored.

Figure 7:
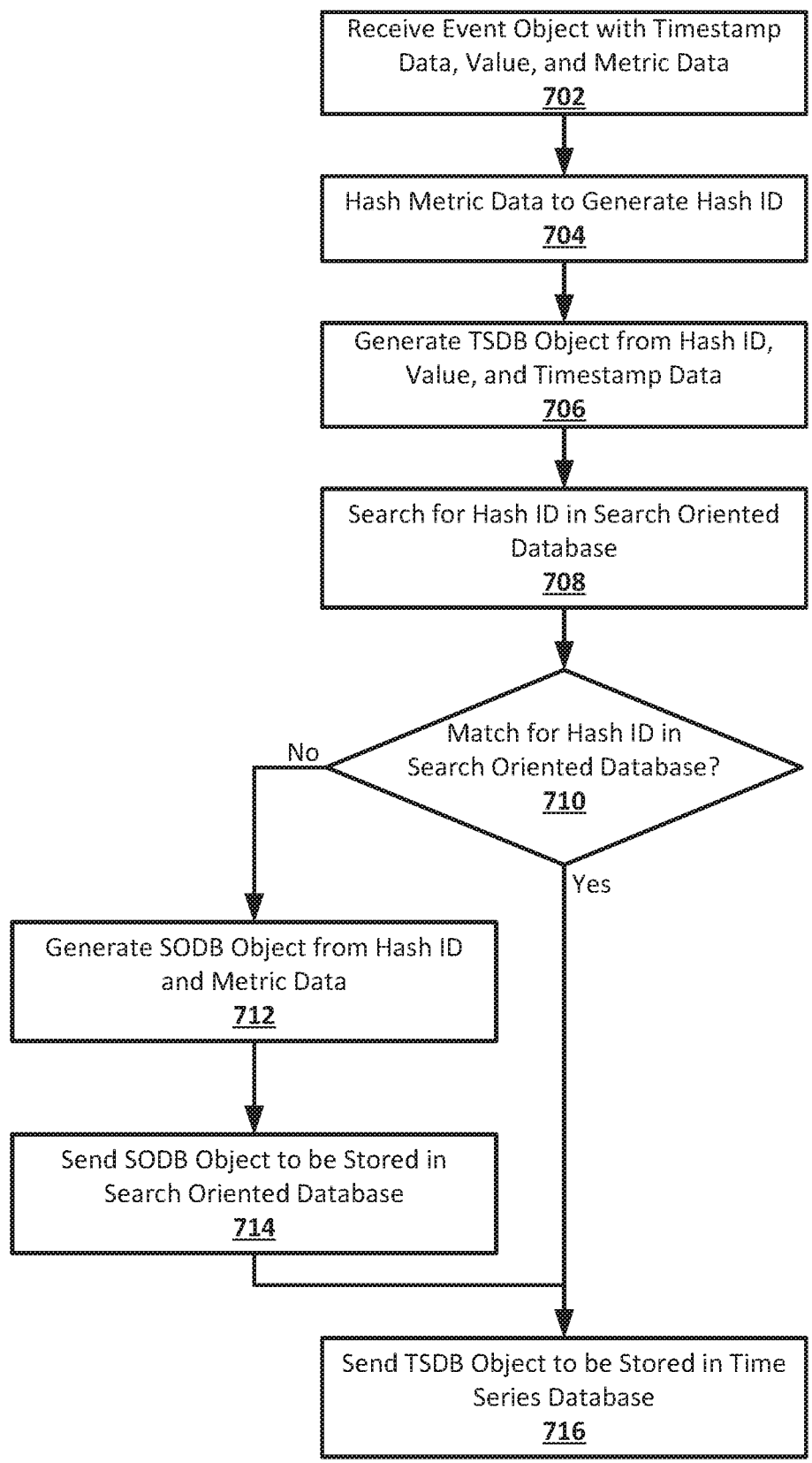
FIG. 7 shows an example procedure suitable for a time series database search system according to an implementation of the disclosed subject matter.

FIG. 7 shows an example procedure suitable for a time series database search system according to an implementation of the disclosed subject matter. At 702, an event object with timestamp data, a value, and metric data may be received. For example, the database server system 100 may receive the event object A 521, including the timestamp data A 122, the value A 124 and the metric data A 132, which may be generated by the event source 170 based on the occurrence of an event. The event source 170 may be, for example, a server system, and the event may be the sending of an email by the server system. The timestamp data A 122 may include the timestamp 522, which may indicate the time, including, for example, time, day, date, and year, when the event occurred, and may be in any suitable format. The value A 124 may include any suitable value, such as a number, which may be a measure for the event that resulted in the generation of the event object A 521. The metric data A 132 may include key-value pairs, such as the key-value pairs 526, 527, and 528, which may include data about the event.

At 704, the metric data may be hashed to generate a hash ID. For example, the metric data A 132 may be hashed using a one-way hash function by, for example, the event ingestion 110 using the hasher 530. The metric data A 132 may be hashed in any suitable manner. For example, the key-value pairs in the metric data A 132, such as the key-value pairs 526, 527, and 528, may be concatenated into a single string, which may then be hashed to produce a hash ID, such as the hash ID A 123, which may be a string of characters.

At 706, a TSDB object may be generated from the hash ID, value, and timestamp data. For example, the TSDB object A 121 may be generated using the timestamp data A 122, the value A 124, and the hash ID A 123.

At 708, the hash ID may be searched for in a search-oriented database. For example, the hash IDs of SODB objects stored in search-oriented database 130 may be checked against the hash ID A 123 generated from the metric data A 132 of the event object A 521.

At 710, if there is a match for the searched for hash ID in the search-oriented database, flow may proceed to 716. Otherwise, flow may proceed to 712. For example, a match may be found for the hash ID A 123 if there is an SODB object already stored in the search-oriented database 130 that includes the hash ID A 123. If a match for the hash ID A 123 is found in the search oriented database 130, no SODB object may be generated from the hash ID A 123 and the metric data A 132, as the search oriented database 130 may already store an SODB object that includes the hash ID A 123 and the metric data A 132. The search-oriented database 130 may only store at most one copy of a given hash ID, so a search for a hash ID may stop when the first matching hash ID is found.

At 712, an SODB object may be generated from the hash ID and the metric data. For example, no match for the hash ID A 123 may have been found in the search-oriented database 130. The SODB object A 131 may be generated using the hash ID A 123 and the metric data A 132.

At 714, the SODB object may be sent to be stored in the search oriented database. For example, no match for the hash ID A 123 may have been found in the search-oriented database 716. The SODB object A 131 may be sent to the search-oriented database 130 to be stored as a SODB object.

At 716, the TSDB object may be sent to be stored in a time series database. For example, the TSDB object A 121 may be sent to the time series database 120 to be stored as a TSDB object.

Figure 8:
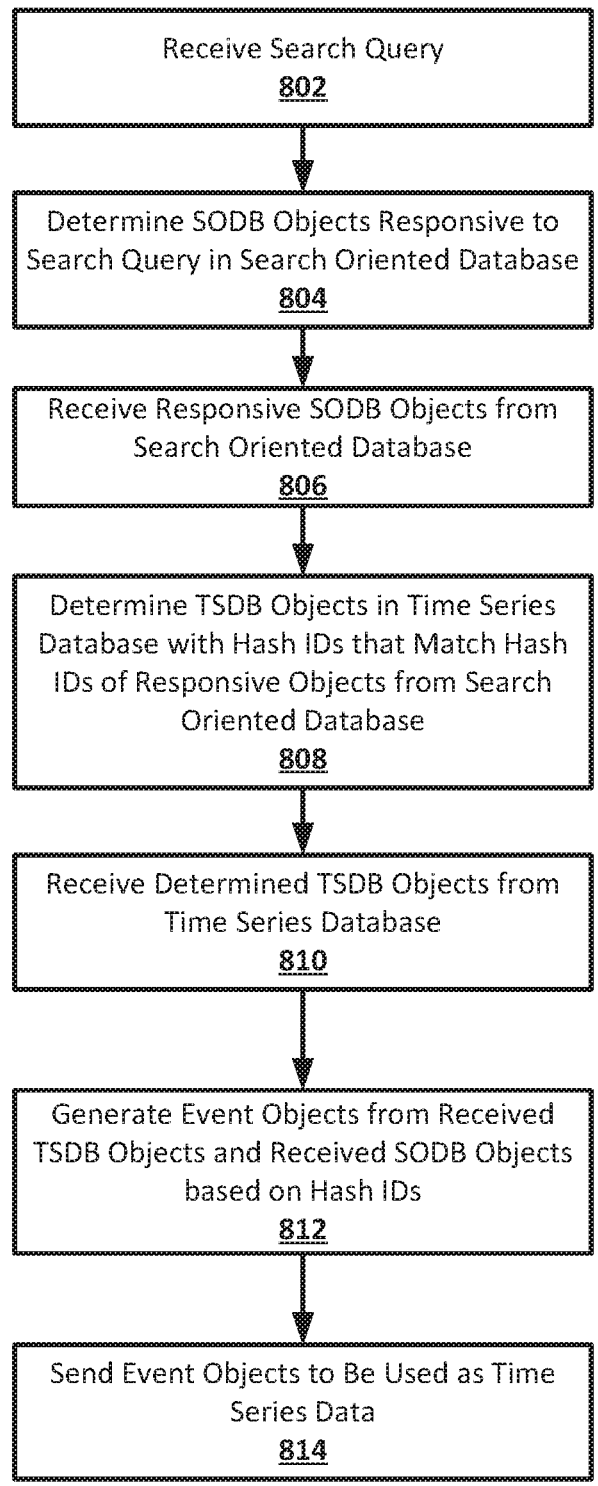
FIG. 8 shows an example procedure suitable for a time series database search system according to an implementation of the disclosed subject matter.

FIG. 8 shows an example procedure suitable for a time series database search system according to an implementation of the disclosed subject matter. At 802, a search query may be received. For example, the database system server 100 may receive a search query from the computing device 200. The search query may include any suitable combination of any number of search terms, joined with and modified by any suitable search operators, for searching the key-value pairs stored in the search-oriented database 130 and any number of time ranges against which the timestamps in timestamp data stored in the time series database 120 may be compared. For example, a search query may include search terms and a time range, just search terms, or just a time range. The search query may be submitted using a form which may allow for the selection of keys and values stored in the search oriented database 130.

At 804, SODB objects in a search-oriented database that are responsive to the search query may be determined. For example, the search-oriented database 130 may be searched for any search terms in the search query. The search terms may be searched against the key-value pairs, such as the key-value pairs 526, 527, and 528, stored in the metric data of SODB objects, such as the SODB object A 131 and SODB object B 135. SODB objects which include key-value pairs that match the terms of the search query, as joined or modified by any search operators, may be returned as responsive to the search query. Searching of the search-oriented database may be performed in any suitable manner. The search query may be sent to the search-oriented database 130 by, for example, the event retriever 240.

At 806, responsive SODB objects may be received. For example, if the SODB object A 131 is responsive to the search query, the event retriever 240 may receive the SODB object A 131 from the search-oriented database 130.

At 808, TSDB objects in the time series database with hash IDs that match the hash IDs of the responsive SODB objects received from the search-oriented database may be determined. For example, the SODB object A 131 may have been received as being responsive to the search query. The hash ID A 123 may be searched for among the hash IDs of the TSDB objects, such as the TSDB object A 121, TSDB object B 125, and TSDB object C 325, stored in the time series database 130. Objects with a hash ID that matches the hash ID A 123, such as the TSDB object A 121 and the TSDB object C 325, may be determined.

At 810, the determined TSDB objects may be received from the time series database. For example, the TSDB object A 121 and the TSDB object C 325 may both include the hash ID A 123, which may match the hash ID A 123. The TSDB object A 121 and the TSDB object C 325 may be received from the time series database 130 by, for example, the event retriever 240.

At 812, event objects may be generated from the received TSDB objects and received SODB objects based on hash IDs. For example, the event retriever 240 may have received the SODB object A 131 and the SODB object B 135 as responsive to the search query, and the TSDB object A 121, the TSDB object B 125, and the TSDB object C 325 based on searching for the hash ID A 121 and the hash ID B 127 in the time series database 130. A copy of the event object A 521 may be generated based on combining the metric data A 132 from the SODB object A 131 and the timestamp data A 122 and the value A 124 from the TSDB object A 121, as the SODB object A 131 and the TSDB object A 121 may have the matching hash ID A 123. A copy of the event object B may be generated based on combining the metric data B 136 from the SODB object B 135 and the timestamp data B 126 from the TSDB object B 125, as the SODB object B 135 and the TSDB object B 125 may have the matching hash ID B 127. A copy of the event object C 621 may be generated based on combining the metric data C 132 from the SODB object A 131 and the timestamp data C 326 and the value C 327 from the TSDB object C 325, as the SODB object A 131 and the TSDB object C 325 may have the matching hash IDA 123.

At 814, the event objects may be sent to be used as time series data. For example, the event retriever 240 may send the generated event objects, for example, the copy of the event object A 521, the copy of the event object B, and the copy of the event object C 621, to the computing device 200. Data in the event objects, for example, the value, metric data and timestamp data, may be visualized, analyzed, aggregated, or otherwise used as time series data, with the chronology of the event objects based on the timestamp data stored in the event objects.

Figure 9:
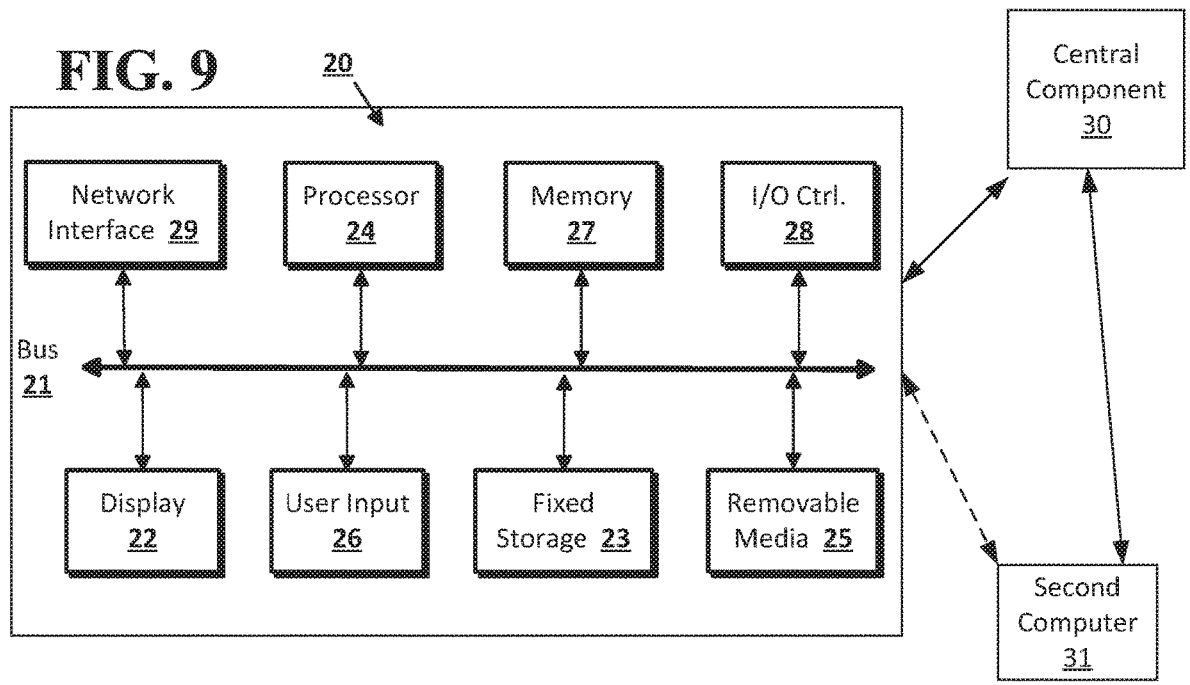
FIG. 9 shows a computer according to an implementation of the disclosed subject matter.

Implementations of the presently disclosed subject matter may be implemented in and used with a variety of component and network architectures. FIG. 9 is an example computer 20 suitable for implementing implementations of the presently disclosed subject matter. As discussed in further detail herein, the computer 20 may be a single computer in a network of multiple computers. As shown in FIG. 9, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
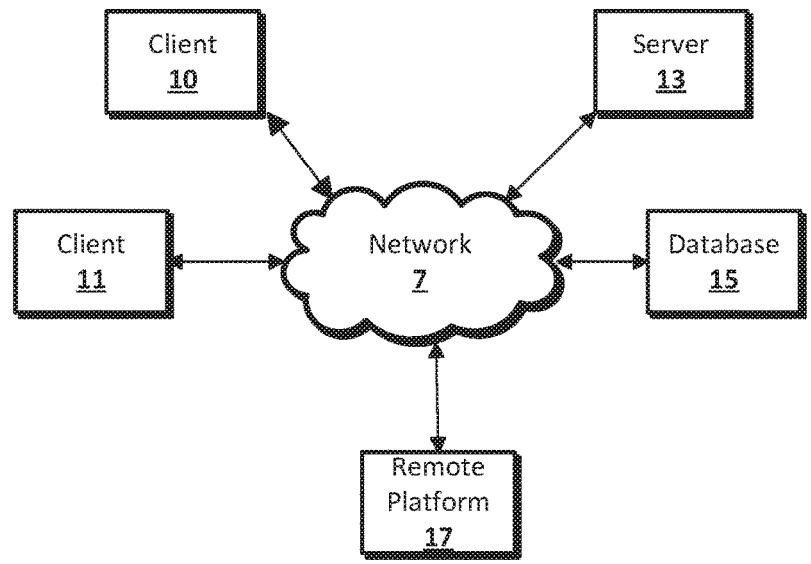
FIG. 10 shows a network configuration according to an implementation of the disclosed subject matter.

FIG. 10 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving a first data object and a second data object, each comprising respective timestamp data indicating respective times at which respective events occurred, respective values indicating respective measures of the respective events, and one or more respective key-value pairs comprising data associated with the respective events;
   generating respective hash IDs for the first data object and the second data obiectID by hashing the one or more respective key-value pairs;
   storing the timestamp data, the value, and the hash ID of the first data object in a first database as a first object in the first database and the timestamp data, the value, and the hash ID of the second data object in the first database as a second object in the first database; and
   storing the one or more key-value pairs and the hash ID of the first data object in a second database as a first object in the second database, wherein the timestamp data is not stored in the first object in the second database;
   determining that the hash ID of the second data object is equal to the hash ID of the first object in the second database; and
   not storing the one or more key-value pairs and the hash ID of the second data object in the second database.

2. The computer-implemented method of claim 1, further comprising:
   receiving a search query comprising at least one search term;
   determining that the first object in the second database is responsive to the search query based on the at least one search term;
   determining that the hash ID from the first object in the second database matches at least the hash ID from the first object in the first database and the second hash ID from the second object in the first database; and
   returning, responsive to the search query, a first responsive data object comprising the one or more key-value pairs of the first object in the second database and the timestamp data and the value of the first object in the first database, and a second responsive data object comprising the one or more key-value pairs of the first object in the second database and the second timestamp data and the second value of the second object in the first database.

3. The computer-implemented method of claim 1, further comprising:
   receiving a search query comprising a time range and at least one search term;
   determining that the first object in the second database is responsive to the search query based on the at least one search term;
   determining that the hash ID from the first object in the second database matches at least the hash ID from the first object in the first database and the second hash ID from the second object in the first database;
   determining that at least one of the first object in the first database and the second object in the first database is a within the time range based at least one of the timestamp data and the second timestamp data indicating a time that is within the time range; and
   returning, responsive to the search query, at least one data object comprising the one or more key-value pairs of the first object in the second database and the timestamp data and the value or the second timestamp and the second value of the at least one of the first object in the first database and the second object in the first database that is within the time range.

4. The computer-implemented method of claim 1, further comprising:
   receiving a search query comprising a time range;
   determining that at least one of the first object in the first database and the second object in the first database is a within the time range based at least one of the timestamp data and the second timestamp data indicating a time that is within the time range;
   determining that the hash ID from the at least one of the first object in the first database and the second object in the first database that is within the time range matches the hash ID of the first object in the second database; and
   returning, responsive to the search query, at least one data object comprising the one or more key-value pairs of the first object in the second database and the timestamp data and the value or the second timestamp data and the second value of the at least one of the first object in the first database and the second object in the first database that is within the time range.

5. The computer-implemented method of claim 1, wherein the first database is a time series database and wherein the second database is a search oriented database.

6. The computer-implemented method of claim 1, wherein the one or more key-value pairs of the first data object are metric data for the respective event of the first data object.

7. The computer-implemented method of claim 1, wherein the second database stores a plurality of objects, each of the plurality of objects comprising a hash ID and one or more key-value pairs, wherein none of the plurality of objects in the second database comprises a timestamp, and wherein none of the plurality of objects in the second database has the same hash ID as any other object in the second database.

8. The computer-implemented method of claim 1, wherein the first database stores a plurality of objects, each of the plurality of objects comprising a hash ID, a value, and timestamp data, and wherein for each object stored in the second database there is at least one object among the plurality of objects stored in the first database with a hash ID that matches the hash ID of the first object stored in the second database.

9. A computer-implemented system for a time series database search system comprising:
one or more storage devices that store objects for a first database and objects for a second database; and
a processor that receives a first data object and a second data object, each comprising respective timestamp data indicating respective times at which respective events occurred, respective values indicating a respective measures of the respective events, and one or more respective key-value pairs comprising data associated with the respective events, generates respective hash IDs for the first data object and the second data object by hashing the one or more respective key-value pairs, stores the timestamp data, the value, and the hash ID of the first data object in the first database as a first object in the first database and the timestamp data, the value, and the hash ID of the second data object in the first database as a second object in the first database, and stores the one or more key-value pairs and the hash ID of the first data object in the second database as a first object in the second database, wherein the timestamp data is not stored in the first object in the second database, determines that the hash ID of the second data object is equal to the hash ID of the first object in the second database, and does not store the one or more key-value pairs and the hash ID of the second data object in the second database.

10. The computer-implemented system of claim 9, wherein the processor further receives a search query comprising at least one search term, determines that the first object in the second database is responsive to the search query based on the at least one search term, determines that the hash ID from the first object in the second database matches at least the hash ID from the first object in the first database and the second hash ID from the second object in the first database, and returns, responsive to the search query, a first responsive data object comprising the one or more key-value pairs of the first object in the second database and the timestamp data and the value of the first object in the first database, and a second responsive data object comprising the one or more key-value pairs of the first object in the second database and the second timestamp data and the second value of the second object in the first database.

11. The computer-implemented system of claim 9, wherein the processor further receives a search query comprising a time range and at least one search term, determines that the first object in the second database is responsive to the search query based on the at least one search term, determines that the hash ID from the first object in the second database matches at least the hash ID from the first object in the first database and the second hash ID from the second object in the first database, determines that at least one of the first object in the first database and the second object in the first database is a within the time range based at least one of the timestamp data and the second timestamp data indicating a time that is within the time range, and returns, responsive to the search query, at least one data object comprising the one or more key-value pairs of the first object in the second database and the timestamp data and the value or the second timestamp data and the second value of the at least one of the first object in the first database and the second object in the first database that is within the time range.

12. The computer-implemented method of claim 9, wherein the processor further receives a search query comprising a time range, determines that at least one of the first object in the first database and the second object in the first database is a within the time range based at least one of the timestamp data and the second timestamp data indicating a time that is within the time range, determines that the hash ID from the at least one of the first object in the first database and the second object in the first database that is within the time range matches the hash ID of the first object in the second database, and returns, responsive to the search query, at least one data object comprising the one or more key-value pairs of the first object in the second database and the timestamp data and the value or the second timestamp data and the second value of the at least one of the first object in the first database and the second object in the first database that is within the time range.

13. The computer-implemented system of claim 9, wherein the first database is a time series database and wherein the second database is a search oriented database.

14. The computer-implemented system of claim 9, wherein the one or more key-value pairs of the first data object are metric data for the respective event of the first data object.

15. The computer-implemented system of claim 9, wherein the second database stores a plurality of objects, each of the plurality of objects comprising a hash ID and one or more key-value pairs, wherein none of the plurality of objects in the second database comprises a timestamp, and wherein none of the plurality of objects in the second database has the same hash ID as any other object in the second database.

16. The computer-implemented system of claim 9, wherein the first database stores a plurality of objects, each of the plurality of objects comprising a hash ID, a value, and timestamp data, and wherein for each object stored in the second database there is at least one object among the plurality of objects stored in the first database with a hash ID that matches the hash ID of the first object stored in the second database.

17. A system comprising:
one or more computers and one or more storage devices storing instructions which are operable, when executed by the one or more computers, to cause the one or more computers to perform operations comprising:
receiving a first data object and a second data object, each comprising respective timestamp data indicating respective times at which respective events occurred, respective values indicating respective measures of the respective events and one or more respective key-value pairs comprising data associated with the respective events;
generating respective hash IDs for the first data object and the second data objectID by hashing the one or more respective key-value pairs;
storing the timestamp data, the value, and the hash ID of the first data object in a first database as a first object in the first database and the timestamp data, the value, and the hash ID of the second data object in the first database as a second object in the first database; and
storing the one or more key-value pairs and the hash ID of the first data object in a second database as a first object in the second database, wherein the timestamp data is not stored in the first object in the second database;
determining that the hash ID of the second data object is equal to the hash ID of the first object in the second database; and
not storing the one or more key-value pairs and the hash ID of the second data object in the second database.

* * * * *